(12) United States Patent
Makphaibulchoke et al.

(10) Patent No.: US 7,007,160 B1
(45) Date of Patent: Feb. 28, 2006

(54) SYSTEM AND METHOD FOR LOADING AN ADVANCED CONFIGURATION AND POWER INTERFACE (ACPI) ORIGINAL EQUIPMENT MANUFACTURER (OEM) DESCRIPTION TABLE

(75) Inventors: Thavatchai Makphaibulchoke, Arlington, TX (US); Matthew Fischer, Plano, TX (US); Subramanian Ramesh, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 511 days.

(21) Appl. No.: 10/308,571

(22) Filed: Dec. 3, 2002

(51) Int. Cl.
*G06F 15/177* (2006.01)

(52) U.S. Cl. .................................................. 713/1
(58) Field of Classification Search .................... 713/1, 713/2; 712/300
See application file for complete search history.

(56) References Cited

U.S. PATENT DOCUMENTS

| | | | | |
|---|---|---|---|---|
| 5,423,010 | A * | 6/1995 | Mizukami ..................... | 341/60 |
| 6,167,511 | A * | 12/2000 | Lewis ........................... | 713/2 |
| 6,185,677 | B1 * | 2/2001 | Nijhawan ...................... | 713/2 |
| 6,243,808 | B1 * | 6/2001 | Wang ........................... | 712/300 |
| 6,314,501 | B1 * | 11/2001 | Gulick et al. ................. | 711/153 |
| 6,388,586 | B1 * | 5/2002 | Fischer et al. ................. | 341/51 |
| 6,792,520 | B1 * | 9/2004 | Qureshi et al. ................ | 711/170 |
| 6,865,614 | B1 * | 3/2005 | Fischer et al. ................. | 709/246 |
| 6,877,018 | B1 * | 4/2005 | Oshins et al. ................. | 707/206 |
| 2003/0014616 | A1 * | 1/2003 | Makphaibulchoke et al. ................. | 712/300 |

OTHER PUBLICATIONS

"Advanced Configuration and Power Interface Specification"; Revision 2.0a; Compaq Computer Corporation, Intel Corporation, Microsoft Corporation, Phoenix Technologies Ltd. and Toshiba Corporation; Mar. 31, 2002; 500 pages.
"ACPI Component Architecture Programmer Reference"; Revision 1.13; Core Subsystem, Debugger and Utilities; Intel; May 3, 2002; 154 pages.
"iASL Compiler User Reference"; Revision 1.01; Intel; May 3, 2002; 10 pages.

* cited by examiner

*Primary Examiner*—Chun Cao (57) ABSTRACT

A system and method for loading an Advanced Configuration and Power Interface (ACPI) original equipment manufacturer (OEM) description table in a computer platform employing an ACPI-compatible implementation is disclosed. In one embodiment of the system, a storage structure is operably associated with the computer platform and contains a copy of an ACPI OEM description table in a packed form. An acquirer is operable to search the storage structure fop the ACPI OEM description table and call a swapper to complete the loading of the ACPI OEM description table by issuing a signature search request.

23 Claims, 6 Drawing Sheets

SYSTEM AND METHOD FOR LOADING AN ADVANCED CONFIGURATION AND POWER INTERFACE (ACPI) ORIGINAL EQUIPMENT MANUFACTURER (OEM) DESCRIPTION TABLE

BACKGROUND

The Advanced Configuration and Power Interface (ACPI) specification is a computer architecture-related standard developed to establish industry common interfaces for enabling robust operating system (OS)-directed motherboard device configuration and power management of both devices and entire platforms. The ACPI specification evolves the existing collection of power management basic input/output system (BIOS) code, Advanced Power Management (APM) Application Program Interfaces (APIs), Plug and Play Basic Input/Output System (PNPBIOS) APIs, and Multiprocessor Specification (MPS) tables, into a well-defined, integrated power management and configuration interface specification. From a manufacturing and implementation perspective, the ACPI specification enables different computer platforms to implement common motherboard configuration and power management functions. From a power management perspective, it promotes the concept that platforms should conserve energy by transitioning unused devices into lower power states. For example, computer platforms employing ACPI-compatible implementations are able to optimize processor clock speed, control motherboard and peripheral device power consumption, and place an entire computer platform into a low-power or sleeping state.

Centralizing power management and related directives in the OS has made it practical and compelling for original equipment manufacturers (OEMs) to support and exploit ACPI-defined interfaces. To implement ACPI-defined interfaces and take advantage of the functionality offered by them, OEMs include OEM devices that are supported by OEM description tables, commonly called "OEMX tables." Description tables, including the OEMX tables and ACPI specification supported tables, enable device operation by providing the computer platform, and in particular an ACPI subsystem, with the specifications of the interfaces and features of the device.

The existing implementation of OEMX tables, however, is not without limitations. For instance, during the initialization of the computer platform, the ACPI subsystem loads the necessary description tables, including the OEMX tables, based on firmware access defined by the platform's OS. To load a particular description table, accordingly, the ACPI subsystem requires knowledge of the layout of the table. For tables defined by the ACPI standards, such as Secondary System Description Tables (SSDTs), this is not a problem. The format, structure and contents of OEMX vendor tables, however, is entirely up to the OEM vendor and unknown to the ACPI subsystem. Accordingly, during initialization, the ACPI subsystem cannot load the OEMX tables in a vendor-neutral and platform-neutral manner without breaching the modularity between the kernel space and OEM code space where the knowledge of the layout of the OEM tables is stored.

SUMMARY

A system and method for loading an Advanced Configuration and Power Interface (ACPI) original equipment manufacturer (OEM) description table in a computer platform employing an ACPI-compatible implementation is disclosed. In one embodiment of the system, a storage structure is operably associated with the computer platform and includes a copy of an ACPI OEM description table in a packed form. An acquirer is operable to search the storage structure for the ACPI OEM description table and call a swapper to complete the loading of the ACPI OEM description table by issuing a signature search request.

DETAILED DESCRIPTION OF THE DRAWINGS

Figure 1:
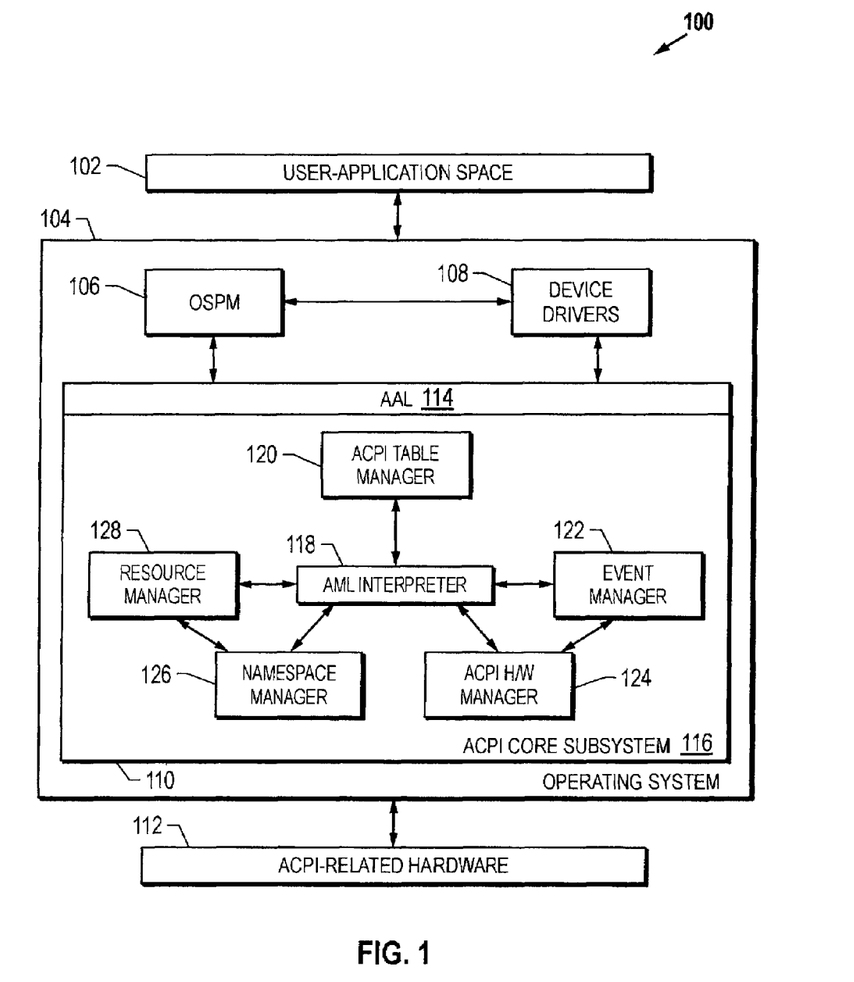
FIG. 1 depicts a functional block diagram of a computer platform having an ACPI-compatible implementation wherein a scheme for loading an ACPI OEM description table is provided.

In the drawings, like or similar elements are designated with identical reference numerals throughout the several views thereof, and the various elements depicted are not necessarily drawn to scale. Referring now to FIG. 1, depicted therein is an embodiment of a computer platform 100 having an Advanced Configuration and Power Interface (ACPI)-compatible implementation. A user-space application or user-application space 102 includes user software application programs that carry out various useful tasks by accessing underlying services provided by an operating system (OS) kernel space 104 which includes an Operating System-directed Power Manager (OSPM) 106, device drivers 108, and an ACPI subsystem 110.

The OSPM 106 provides the instructions for executing a model of power and system management wherein the OS kernel space 104 plays a central role and uses global information to optimize platform behavior for the task at hand. The device driver 108 provides the necessary software components that permit the computer platform 100 to communicate with platform hardware devices and ACPI-related hardware devices 112 including components such as liquid crystal displays (LCD) panels, video adapters, integrated drive electronics (IDEs), CD-ROMs, hard disk controllers, and other ACPI-compatible implementations that are outside the core chip set of the computer platform 100.

The ACPI subsystem 110 may be a single static or loadable software module such as a device driver or kernel subsystem that implements the fundamental aspects of the ACPI specification via an ACPI Access Layer (AAL) 114 and an ACPI core subsystem 116. The AAL 114 provides a conversion mechanism that interfaces the user-application space 102, OS 104 and the ACPI core subsystem 116. In this manner, the AAL 114 operates as a bidirectional translation service or wrapper for messages from the OS 104 components such as the OSPM 106 and the device driver 108 to the ACPI core subsystem 116, and from the ACPI core subsystem 116 to the OS components.

The ACPI core subsystem 116 provides the fundamental ACPI services that are independent of any particular OS. As illustrated, the ACPI core subsystem 116 may be divided into several logical modules or sub-components that each implement a service or group of related services. An ACPI Driver/ACPI Machine Language (AML) interpreter 118 is responsible for the parsing and execution of AML byte code which executes procedures stored in ACPI system description tables managed by an ACPI table manager 120. The ACPI system description tables describe the interfaces to the ACPI-related hardware devices 112. Some descriptions in the ACPI system description tables 122 limit the hardware that can be built. Most descriptions, however, allow the hardware to be built in variable ways and provide the necessary operation sequences required to make hardware function. The ACPI system description tables may contain definition blocks employing a byte-code type of language which is interpreted by the AML interpreter 118. The definition blocks contain information about hardware implementation and configuration details in the form of data and control methods. As will be described in more detail hereinbelow, the ACPI system description tables include at a minimum a Differentiated System Description Table (DSDT) that contains the primary AML code for the platform, a Fixed ACPI Description Table (FADT) that contains the important configuration information about the ACPI-related hardware 112, and a Firmware ACPI Control Structure (FACS) that contains information about the platform firmware interfaces.

Additionally, the ACPI specification provides vendors with the flexibility to implement devices using description tables not specified in the ACPI specification. These ACPI OEM description tables or OEMX tables, conventionally labeled OEMA–OEMZ, may define specification interfaces and features not contemplated by the ACPI specification and are operable to provide platform-specific and/or vendor-specific proprietary device interface information to the platform's OS. Further, the OEMX tables may take any form; for example, the OEMX tables may be packed using either big endian or little endian convention. Consequently, the ACPI subsystem initially does not possess the necessary knowledge to unpack, swap, and store the OEMX table in an ACPI namespace database, i.e., the ACPI subsystem cannot initially load the OEMX table on its own. It should be appreciated, however, that loading may include variations in the operations of unpacking, swapping, and storing. For example, if the OS requires a little endian compatible format and an OEMX table is in a little endian format, loading may include unpacking and storing. In this embodiment, the operation of swapping would not be unnecessary since the OS and OEMX table employ compatible formats.

The ACPI table manager 120 provides services including ACPI table parsing, ACPI table verification, and ACPI table loading and removal. An event manager 122 handles the ACPI System Control Interrupt (SCI) which multiplexes an ACPI timer, fixed events, and General Purpose Events (GPEs). This component also manages dispatch of notification and Address Space/Operation Region events and provides services including ACPI event enablement, fixed event handling, and address space and operation region handling, for example. An ACPI hardware manager 124 controls access to ACPI registers, timers, and other ACPI-related hardware 112. Additionally, the ACPI hardware manager 124 provides services including ACPI status register, power management access, and hardware integration performance, for example.

A namespace manager 126 provisions ACPI namespace services on top of the AML interpreter 118. For example, the namespace manger 126 builds, manages, and provides access to the internal ACPI namespace. As is well known, the ACPI namespace provides a hierarchical tree structure that contains a number of named objects used to configure, assign, and manage resources for the ACPI-related hardware devices 112. A resource manager 128 provides resource query and configuration services, such as acquiring Interrupt Request (IRQ) routing tables, on top of the namespace manager 126 and the AML interpreter 118.

The ACPI subsystem architecture described herein encourages hardware and software vendors to build modular ACPI-compatible implementations through the use of the ACPI specification-defined description tables and OEM description tables that are platform-neutral and vendor-neutral. It should therefore be appreciated that the ACPI subsystem, OSPM and broader concepts defined therein are suitable to all classes of computers including desktops, mobiles, handhelds, appliance PCs, workstations, and server machines, for example. Accordingly, the computer platform architecture described herein is exemplary only and modifications to the computer platform architecture are within the teachings of the present invention.

Figure 2:
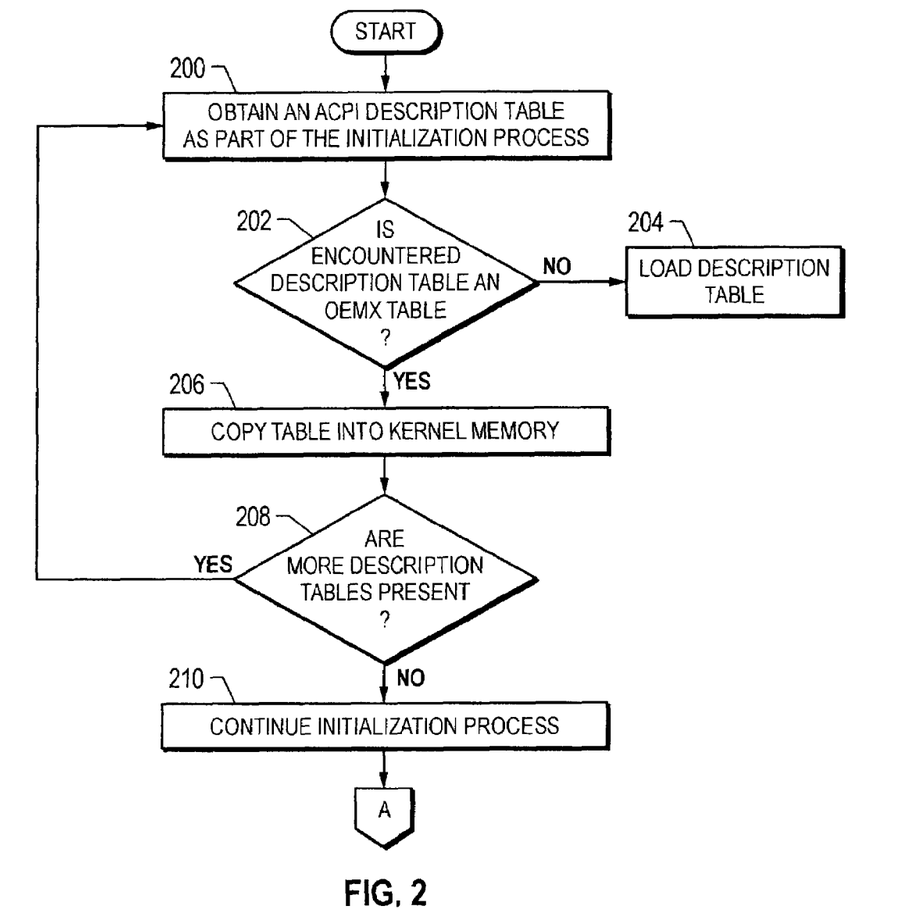
FIG. 2 depicts a flow chart illustrating a method for obtaining an ACPI OEM description table during a computer platform initialization process.

FIG. 2 depicts a method for obtaining an ACPI OEM description table during a computer platform initialization process. At block 200, an ACPI description table is obtained as a part of the initialization process. Typically, the ACPI OEM description tables are obtained early in the initialization process as a part of loading the ACPI description tables during ACPI subsystem initialization. ACPI services are fundamental to the kernel and, accordingly, the initialization of the ACPI subsystem may occur right after bootloader and low level kernel initialization and before other OS initialization operations such as starting a system resource manager and determining processor configuration. The ACPI description table may be obtained from the firmware, loaded from an input buffer, or some combination thereof. At decision block 202, if the encountered ACPI description table is not an OEMX table, the process continues to block 204 where the ACPI description table is loaded into an ACPI namespace database by unpacking and byte-swapping in a normal fashion.

On the other hand, if the encountered ACPI description table is an OEMX table, the process continues to block 206 where a copy of the OEMX table is provided to the ACPI subsystem kernel memory. Since knowledge of the format, structure, and content of a description table are prerequisites to loading the description table, the OEMX table is copied, not loaded, to the ACPI subsystem kernel memory. Accordingly, this methodology preserves the kernel and OEM code space modularity by avoiding accessing the OEM code space to obtain the format, structure, and content of the ACPI description table. At decision block 208, if more description tables are present, the process returns to block 200 as illustrated by the return flow arrow. If no more description tables are present, however, the process continues to block 210, where the initialization process continues. Typically, in one implementation, the ACPI subsystem initialization continues with namespace initialization, ACPI address space initialization, and ACPI object initialization. After the ACPI subsystem has been initialized, the computer platform initialization continues with device enumeration, configuration and initialization followed by a final OS initialization that includes initializing upper layers of the OS and activating a user-application space interface. Additionally, following the ACPI subsystem initialization, the OEM-provided Platform Specific Modules (PSMs) of the OEM code space are initialized to provide an interface between the kernel and OEM code space that maintains the modularity therebetween. After the completion of the initialization processes of block 210, the computer platform is in an operational mode and, when a request to access the OEMX table is made, the illustrated method may proceed to the flow chart depicted in FIG. 3 as represented by advancement block A.

Figure 3:
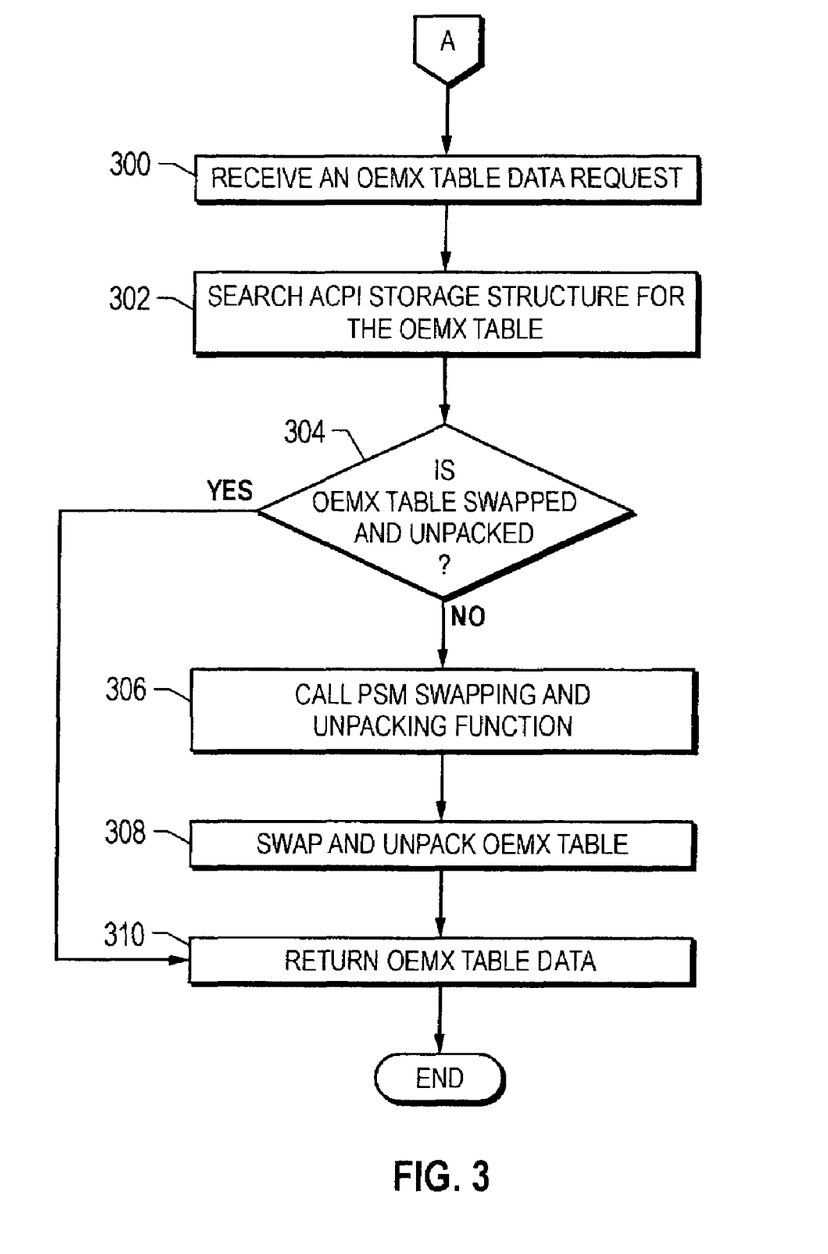
FIG. 3 depicts a flow chart illustrating a method for loading an ACPI OEM description table.

FIG. 3 illustrates a method for loading an ACPI OEM description table. At block 300, the ACPI subsystem receives an OEMX table data request. At block 302, an acquiring function searches the ACPI storage structure for the OEMX table. The acquiring function may take the form of a function call, ACPI_GetTable(parameters), for example. At decision block 304, if the OEMX table is loaded, that is, swapped and unpacked, the process advances to block 310 as illustrated, where the OEMX table data is returned.

If, however, the OEMX table has not been swapped and unpacked, the process advances to block 306 where a PSM-specific swapping and unpacking function is called by the acquiring function. In response thereto, the OEMX table is swapped and unpacked (block 308). By delaying loading the OEMX table until the PSM swapping and unpacking function is available, vendor specific information is not accessed directly and modularity between the kernel and OEM code space is preserved. Moreover, the operations exemplified in blocks 306 and 308 have to be executed only once for each OEMX table because once the OEMX table is unpacked and byte-swapped using the PSM, it is loaded into the ACPI space for further use. At block 310, an OEMX table data return is made in response to the OEMX table request.

Figure 4:
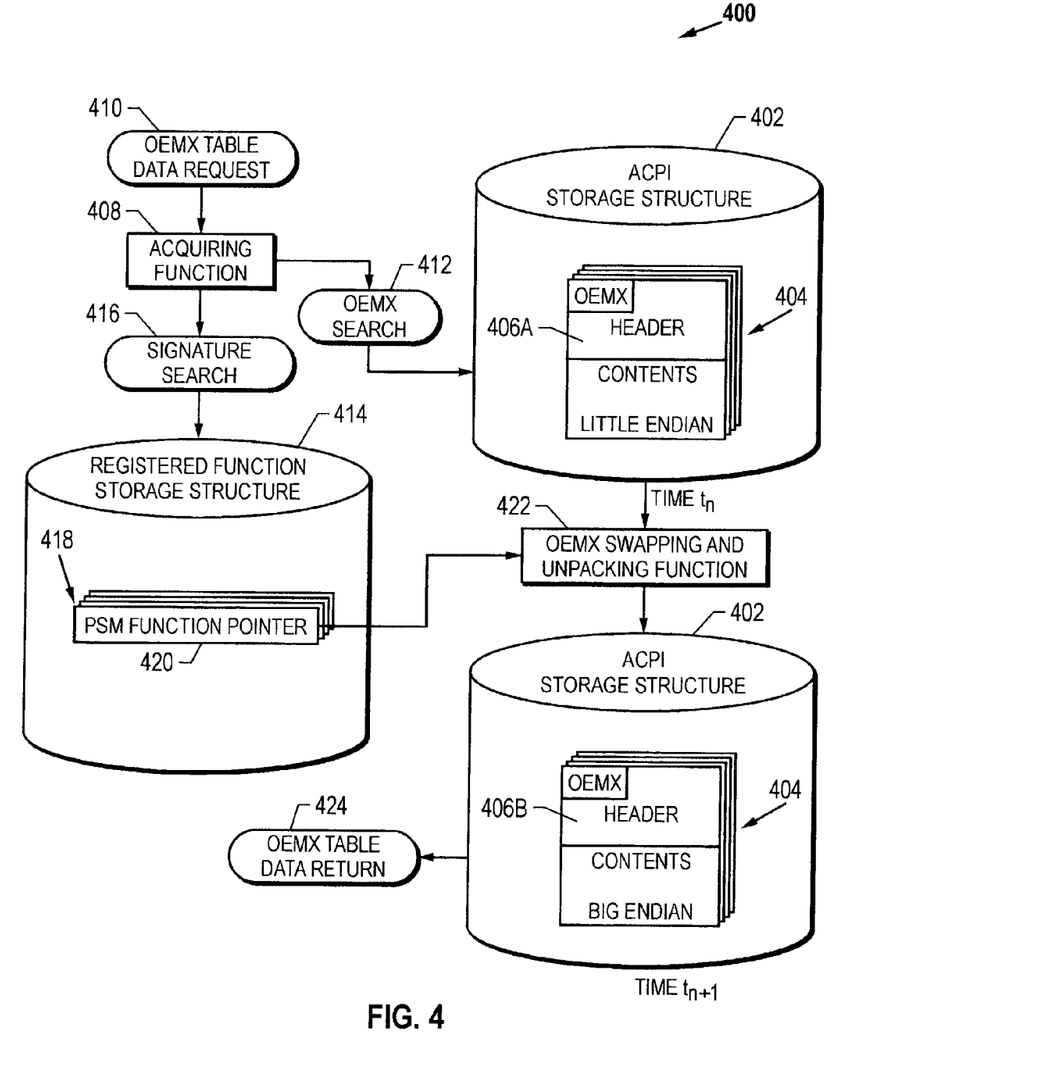
FIG. 4 depicts a schematic diagram of a system for loading an ACPI OEM description table.

FIG. 4 depicts an embodiment of a system 400 for loading an ACPI OEM description table. An ACPI storage structure 402 is illustrated at time $t_n$ and includes ACPI description tables 404. Included in the ACPI description tables 404 is an OEM description table 406A having an OEMX signature, a header, and contents in a little endian format. Additionally, the ACPI description tables 404 may include ACPI specification defined tables such as the aforementioned required DSDT, FADT, and FACS. Additionally, a Root System Description Table (RSDT) which is located in the computer platform's memory address space and once setup by the BIOS or system firmware, provides references to the other ACPI description tables. Other well-known examples of ACPI description tables include Secondary System Description Tables (SSDTs), Multiple APIC Description Tables (MADTs), Smart Battery System Tables (SBSTs), Extended System Description Tables (XSDTs), and Embedded Controller Boot Resources Table (ECDTs), for example.

An acquiring function 408, which may take the form of a software structure that is operable responsive to an OEMX table data request 410, searches the ACPI namespace storage structure 402 at time $t_n$ as represented by an OEMX search request 412. Since the OEMX table is still encoded in a little endian format (that is, the OEMX table is not completely loaded), the acquiring function 408 initiates another search using a registered function storage structure 414. A signature search request 416 is accordingly issued with respect to registered function storage structure 414 which includes an array of registered functions 418 and associated function pointers. In particular, a PSM function pointer 420 points to an OEMX swapping and unpacking function 422 which has an OEMX signature that matches the signature of the OEMX table 406A. The OEMX swapping and unpacking function 422, which may take the form of a PSM function, swaps and unpacks OEMX table 406A to create the loaded OEMX table 406B stored in ACPI storage structure at time $t_{n+1}$. The acquiring function 408 can then respond to the OEMX table data request with an OEMX table data reply as represented by OEMX table data return structure 424. It should be appreciated by those skilled in the art that although little-endian-encoded tables are presented as unloaded and big-endian-encoded tables are presented as loaded, the opposite, that is, the unloaded tables having the big endian format and the loaded tables having the little endian format, is within the teachings of the present invention.

Figure 5:
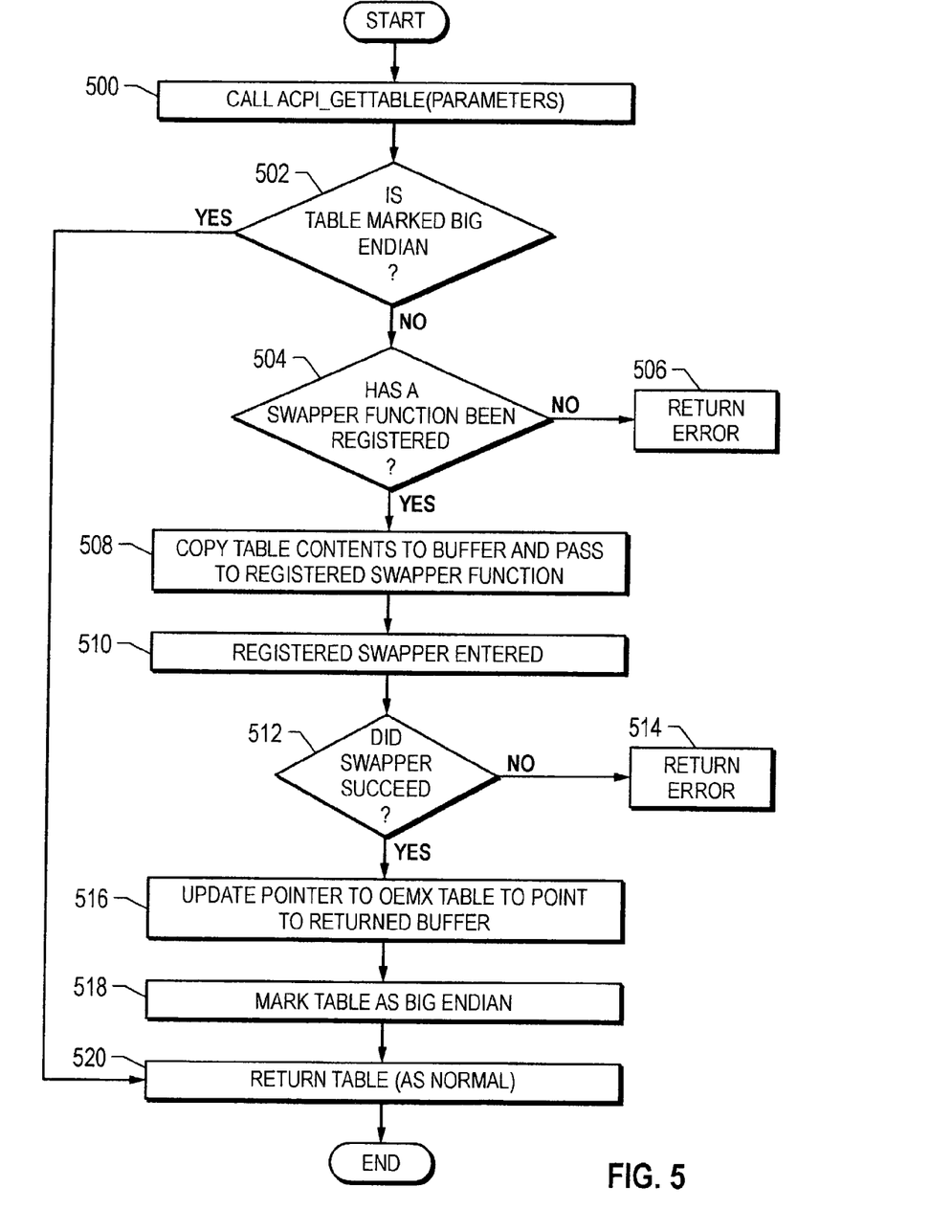
FIG. 5 depicts a flow chart illustrating one embodiment of the method for loading the ACPI OEM description table of FIG. 3.

FIG. 5 illustrates one embodiment of the method for loading the ACPI OEM description table described in FIG. 3. At block 500, a request for an ACPI OEM description table is received by the ACPI subsystem while the computer platform is in an operation mode wherein a function call ACPI_GetTable(parameters) is carried out. At decision block 502, the function call ACPI_GetTable (parameters) searches for the requested ACPI OEM description table. If the ACPI OEM description table is marked big endian, then the table is already loaded and the process advances to block 520 where the table data is returned in normal fashion. Otherwise, if the ACPI OEM description table is marked little endian, then the process advances to decision block 504.

At decision block 504, if a swapper function has not been registered for the ACPI OEM description table then the process advances to block 506 where an error is returned. As previously discussed, however, the computer platform is in operational mode and the PSM functions should have already been initialized. Accordingly, if a swapper function has been registered, the process advances to block 508 where the ACPI OEM description table contents are copied to a buffer and passed to the registered swapper function. At block 510, the registered swapper function provided by a PSM is entered, which performs the following tasks: a buffer for unpacking the OEMX table is created, the OEMX table is unpacked into the buffer and swapped, and the pointer to the buffer is returned. At decision block 512, if the swapper function did not succeed, the process continues to block 514 where an error is returned. On the other hand, upon successful execution of the swapper function, the operation continues to block 516 where the ACPI namespace database pointer to the OEMX table is updated to point to the returned buffer. At block 518, the table is marked as big endian. At block 520, the requested table data is returned for subsequent table-specific operations.

Figure 6:
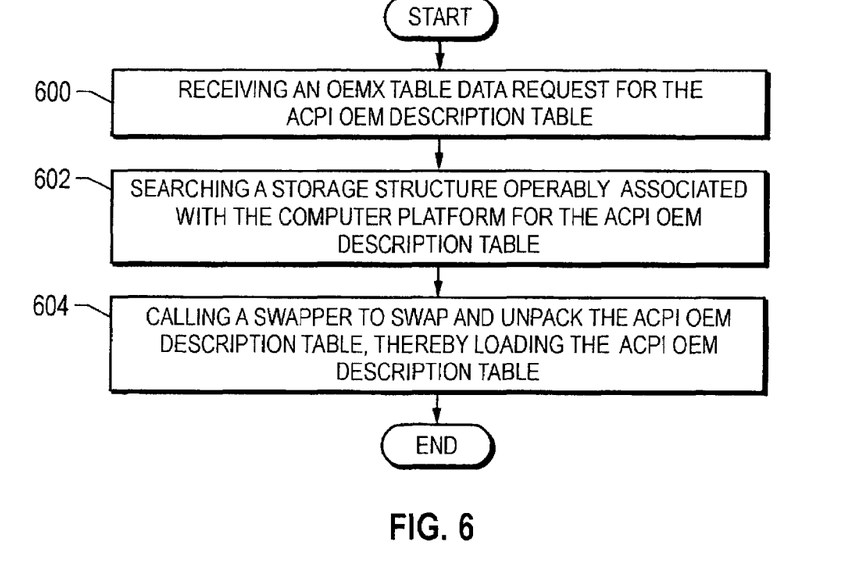
FIG. 6 depicts a flow chart illustrating one embodiment of the aforementioned method for loading the ACPI OEM description table.

From the above it will be understood that a method for loading an ACPI OEM description table in a computer platform employing an ACPI-compatible implementation has been described. This method, in general, as illustrated in FIG. 6, comprises receiving an OEMX table data request for the ACPI OEM description table (block 600), searching a storage structure operably associated with the computer platform for the ACPI OEM description table (block 602), and calling a swapper to swap and unpack the ACPI OEM description table (block 604). In one implementation, a computer-readable medium may be provided that is operable with the computer platform to load the ACPI OEM description table, the medium having stored thereon: instructions for searching a storage structure operably associated with the computer platform for the ACPI OEM description table upon receiving an OEMX table data request for the ACPI OEM description table, wherein the storage structure contains a copy of the ACPI OEM description table in a packed form; and instructions for calling a swapper to swap, and unpack the ACPI OEM description table, the swapper operating responsive to a signature search request issued by an acquiring function.

Figure 7:
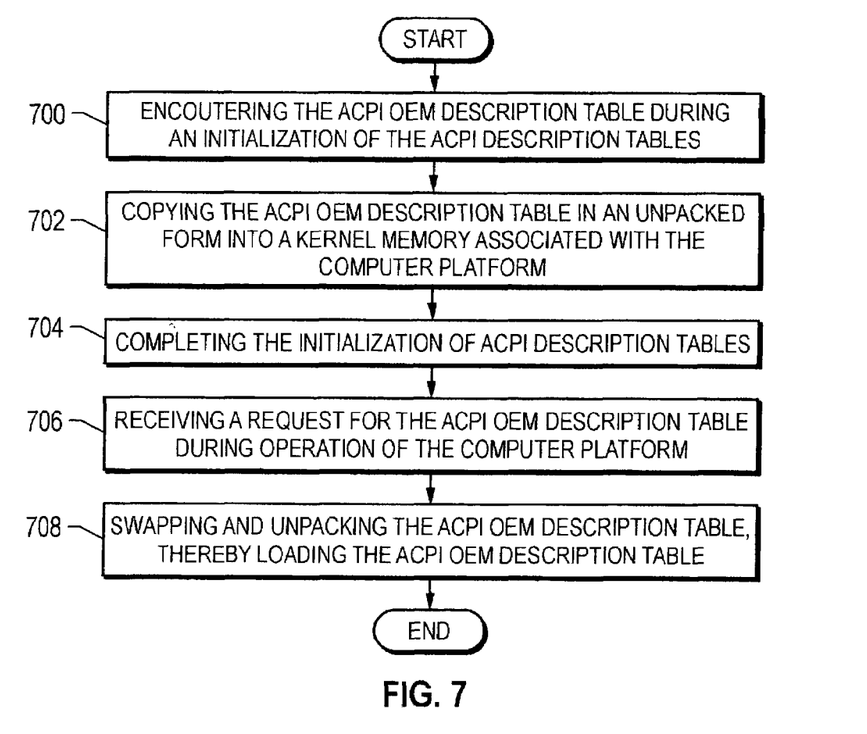
FIG. 7 depicts a flow chart illustrating another embodiment of the aforementioned method for loading the ACPI OEM description table.

Moreover, this method, in general, as illustrated in FIG. 7, comprises encountering the ACPI OEM description table during an initialization of the ACPI description tables (block 700), copying the ACPI OEM description table in an unpacked form into a kernel memory associated with the computer platform (block 702), completing the initialization of ACPI description tables (block 704), receiving a request for the ACPI OEM description table during operation of the computer platform (block 706), and swapping and unpacking the ACPI OEM description table (block 708).

Although the invention has been described in particular detail with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A system for loading an Advanced Configuration and Power Interface (ACPI) original equipment manufacturer (OEM) description table in a computer platform employing an ACPI-compatible implementation, comprising:

a storage structure operably associated with said computer platform, said storage structure containing a copy of said ACPI OEM description table in a packed form;

an acquirer operable to search said storage structure for said ACPI OEM description table responsive to an OEM table data request; and a swapper operable to swap and unpack said ACPI OEM description table responsive to a signature search request issued by said acquirer, whereby said ACPI OEM description table is loaded.

2. The system as recited in claim 1, wherein said storage structure is associated with an ACPI subsystem.

3. The system as recited in claim 1, wherein said storage structure comprises an ACPI namespace database associated with an ACPI subsystem.

4. The system as recited in claim 1, wherein said storage structure further comprises an ACPI description table selected from the at least one of a Differentiated System Description Table (DSDT), a Fixed ACPI Description Table (FADT), a Root System Description Table (RSDT), a Secondary System Description Table (SSDT), a Multiple APIC Description Table (MADT), a Smart Battery System Table (SBST), an Extended System Description Table (XSDT), Firmware ACPI Control Structure (FACS), and an Embedded Controller Boot Resources Table (ECDT).

5. The system as recited in claim 1, wherein said acquirer is associated with an ACPI subsystem.

6. The system as recited in claim 1, wherein said swapper is operable to swap and unpack said ACPI OEM description table from a little endian format to a big endian format or from a big endian-format to a little endian format.

7. The system as recited in claim 1, wherein said swapper is a Platform Specific Module (PSM) swapper.

8. The system as recited in claim 1, wherein said swapper is associated with an OEM specific code space.

9. A method for loading an Advanced Configuration and Power Interface (ACPI) original equipment manufacturer (OEM) description table in a computer platform employing an ACPI-compatible implementation, comprising:

receiving an OEMX table data request for said ACPI OEM description table;

searching a storage structure operably associated with said computer platform for said ACPI OEM description table, said storage structure containing a copy of said ACPI OEM description table in a packed form; and calling a swapper to swap and unpack said ACPI OEM description table, said swapper operating responsive to a signature search request issued by an acquiring function, thereby loading said ACPI OEM description table.

10. The method as recited in claim 9, wherein said searching operation comprises searching a storage structure associated with an ACPI subsystem.

11. The method as recited in claim 9, wherein said searching operation comprises searching an ACPI namespace database associated with an ACPI subsystem.

12. The method as recited in claim 9, wherein said storage structure further comprises an ACPI description table selected from at least one of a Differentiated System Description Table (DSDT), a Fixed ACPI Description Table (FADT), a Root System Description Table (RSDT), a Secondary System Description Table (SSDT), a Multiple APIC Description Table (MADT), a Smart Battery System Table (SBST), an Extended System Description Table (XSDT), Firmware ACPI Control Structure (FACS), and an Embedded Controller Boot Resources Table (ECDT).

13. The method as recited in claim 9, further comprising swapping and unpacking said ACPI OEM description table from a little endian format to a big endian format or from a big endian format to a little endian format.

14. The method as recited in claim 9, wherein said swapper is a Platform Specific Module (PSM) swapper.

15. The method as recited in claim 9, wherein said swapper is associated with an OEM specific code space.

16. A method for loading an Advanced Configuration and Power Interface (ACPI) original equipment manufacturer (OEM) description table in a computer platform employing an ACPI-compatible implementation, comprising:

copying an ACPI OEM description table in a packed form into a kernel memory associated with said computer platform;

receiving a request for said ACPI OEM description table during operation of said computer platform; and swapping and unpacking said ACPI OEM description table responsive to a signature search request issued by an acquiring function, thereby loading said ACPI OEM description table.

17. The method as recited in claim 16 further comprising encountering an ACPI description table selected from at least one of a Differentiated System Description Table (DSDT), a Fixed ACPI Description Table (FADT), a Root System Description Table (RSDT), a Secondary System Description Table (SSDT), a Multiple APIC Description Table (MADT), a Smart Battery system Table (SBST), an Extended System Description Table (XSDT), Firmware ACPI Control Structure (FACS), and an Embedded Controller Boot Resources Table (ECDT).

18. The method as recited in claim 16 wherein said ACPI OEM description table is copied into a kernel memory from an OEM code space.

19. The method as recited in claim 16 wherein said swapping and unpacking said ACPI OEM description table further comprises calling a Platform Specific Module (PSM) swapper.

20. The method as recited in claim 19 wherein said PSM swapper is associated with an OEM code space.

21. The method as recited in claim 16 wherein said swapping and unpacking said ACPI OEM description table comprises swapping and unpacking said ACPI OEM description table from a little endian format to a big endian format or from a big endian format to a little endian format.

22. A computer-readable medium operable with a computer platform to load an Advanced Configuration and Power Interface (ACPI) original equipment manufacturer (OEM) description table, said computer platform employing an ACPI-compatible implementation, the medium having stored thereon:

instructions for searching a storage structure operably associated with said computer platform for said ACPI OEM description table upon receiving an OEMX table data request for said ACPI OEM description table, said storage structure containing a copy of said ACPI OEM description table in a packed form; and instructions for calling a swapper to swap and unpack said ACPI OEM description table, said swapper operating responsive to a signature search request issued by an acquiring function.

23. A system for loading an Advanced Configuration and Power Interface (ACPI) original equipment manufacturer (OEM) description table in a computer platform employing an ACPI-compatible implementation, comprising:

storage means associated with said computer platform for storing a copy of said ACPI OEM description table in a packed form;

acquiring function means operable to search said storage means for said ACPI OEM description table responsive to an OEM table data request; and means for swapping and unpacking said ACPI OEM description table responsive to a signature search request issued by said acquiring function means, whereby said ACPI OEM description table is loaded.

* * * * *

UNITED STATES PATENT AND TRADEMARK OFFICE
CERTIFICATE OF CORRECTION

PATENT NO.        : 7,007,160 B1
APPLICATION NO. : 10/308571
DATED             : February 28, 2006
INVENTOR(S)       : Thavatchai Makphaibulchoke et al.

It is certified that error appears in the above-identified patent and that said Letters Patent is hereby corrected as shown below:

On the Title Page, Item (57), under "Abstract", line 9, after "structure" delete "fop" and insert -- for --, therefor.

In column 7, line 46, in Claim 4, after "from" delete "the".

In column 7, line 59, in Claim 6, delete "endian-format" and insert -- endian format --, therefor.

Signed and Sealed this

Twenty-eighth Day of July, 2009

JOHN DOLL
*Acting Director of the United States Patent and Trademark Office*